US008423767B2

(12) United States Patent
Detienne

(10) Patent No.: US 8,423,767 B2
(45) Date of Patent: Apr. 16, 2013

(54) SECURITY ASSOCIATION VERIFICATION AND RECOVERY

(75) Inventor: Frederic R. P. Detienne, Harze (BE)

(73) Assignee: Cisco Technology, Inc., San Jose, CA (US)

( * ) Notice: Subject to any disclaimer, the term of this patent is extended or adjusted under 35 U.S.C. 154(b) by 1160 days.

(21) Appl. No.: 11/762,321

(22) Filed: Jun. 13, 2007

(65) Prior Publication Data

US 2008/0313461 A1    Dec. 18, 2008

(51) Int. Cl.
*H04L 29/06*    (2006.01)

(52) U.S. Cl.
USPC ............................................. 713/168; 726/14

(58) Field of Classification Search .................. 713/150, 713/168, 169, 171; 380/255, 278, 283, 286; 709/221, 227, 228, 230, 232, 233, 235
See application file for complete search history.

(56) References Cited

U.S. PATENT DOCUMENTS

| | | | |
|---|---|---|---|
| 6,636,898 B1 * | 10/2003 | Ludovici et al. | 709/250 |
| 6,976,071 B1 * | 12/2005 | Donzis et al. | 709/224 |
| 7,107,464 B2 * | 9/2006 | Shapira et al. | 726/15 |
| 7,155,740 B2 * | 12/2006 | Brustoloni | 726/15 |
| 7,350,233 B1 * | 3/2008 | Lee et al. | 726/15 |
| 7,370,194 B2 * | 5/2008 | Morais et al. | 713/153 |
| 7,562,386 B2 * | 7/2009 | Balissat et al. | 726/15 |
| 8,141,126 B2 * | 3/2012 | Gearhart et al. | 726/1 |
| 2002/0046348 A1 * | 4/2002 | Brustoloni | 713/201 |
| 2003/0126429 A1 * | 7/2003 | Jinmei et al. | 713/153 |
| 2004/0133798 A1 * | 7/2004 | Swander | 713/200 |
| 2008/0046971 A1 * | 2/2008 | Swander | 726/3 |
| 2008/0172582 A1 * | 7/2008 | Sinicrope et al. | 714/48 |

OTHER PUBLICATIONS

Kaufman, "Internet Key Exchange (IKEv2) Protocol", Dec. 2005, Network Working Group, Request for Comments: 4306.*
Detienne, "Re: ipsec error protocol", Jan. 17, 2001, Accessed Jun. 28, 2010 <http://www.vpnc.org/ietf-ipsec/01.ipsec/msg00073.html>.*
Detienne, "Re: ipsec error protocol", Jan. 30, 2001, Accessed Jun. 28, 2010 < http://www.vpnc.org/ietf-ipsec/01.ipsec/msg00173.html>.*
Detienne, "Re: ipsec error protocol", Jan. 22, 2001, Accessed Jun. 28, 2010 < http://www.vpnc.org/ietf-ipsec/01.ipsec/msg00101.html>.*
Nir et al., "A Quick Crash Detection Method for Ike", 2009, Network Working Group Internet—Draft.*
Detienne et al., "Safe IKE Recovery", 2009, IESG Internet—Draft.*
Sheffer et al., Stateless Session Resumption for the IKE Protocol, Network Working Group Internet—Draft, Jan. 19, 2007.*
Ramamoorthi, "Re: ipsec error protocol", Jan. 24, 2001, Accessed Jan. 10, 2011 <http://www.vpnc.org/ietf-ipsec/01.ipsec/msg00140.html>.*

* cited by examiner

*Primary Examiner* — Eleni Shiferaw
*Assistant Examiner* — Hilary Branske
(74) *Attorney, Agent, or Firm* — Hickman Palermo Truong Becker Bingham Wong LLP

(57) ABSTRACT

Example embodiments herein include a verification process that provides a safe and efficient mechanism for recovering security associations between network devices. More specifically, the verification process transmits a secured message from a first network device to a second network device across a network. Furthermore, the security association includes a parent process and a corresponding child process. The verification process detects, at the first network device, an incompatibility in the security association between the first network device and the second network device. Next, the verification process transmits a status query from the first network device to the second network device in order to determine the status of the security association between the first network device and the second network device. In response, the verification process receives a verifiable reply message that is indicative of the status of the security association between the first network device and the second network device.

20 Claims, 10 Drawing Sheets

US 8,423,767 B2

SECURITY ASSOCIATION VERIFICATION AND RECOVERY

FIELD OF THE INVENTION

The present disclosure relates generally to methods and procedures for recovering from dangling security association occurrences in an Internet Key Exchange (IKE) and Internet Protocol Security (IPsec) protocol networking environment.

BACKGROUND

An automated-key management protocol that is commonly used in automated-keyed systems is the well-known Internet Key Exchange (IKE) protocol. IKE provides a standardized method for dynamically authenticating Internet Protocol Security (IPsec) entities, negotiating security services, and generating shared keys. IKE has evolved from many different protocols and can be thought of as having various distinct capabilities. Similarly, IPsec keying information (e.g., encryption keys) is used to encrypt and decrypt information exchanged between entities nodes. The keying information may be established and maintained either manually or automatically.

An important concept that appears in both the authentication and confidentiality mechanisms for IKE/IPsec is the Security Association (SA). Authentication mechanisms often utilize authentication security associations. An authentication security association is a logical connection between peers that affords security services to the traffic carried on it. The traffic carried on the authentication security association typically includes authentication related information. An authentication security association may be uniquely identified by several parameters which may include, for example, an Initiator Cookie, Responder Cookie, a local source address and a destination address.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Overview

Figure 1:
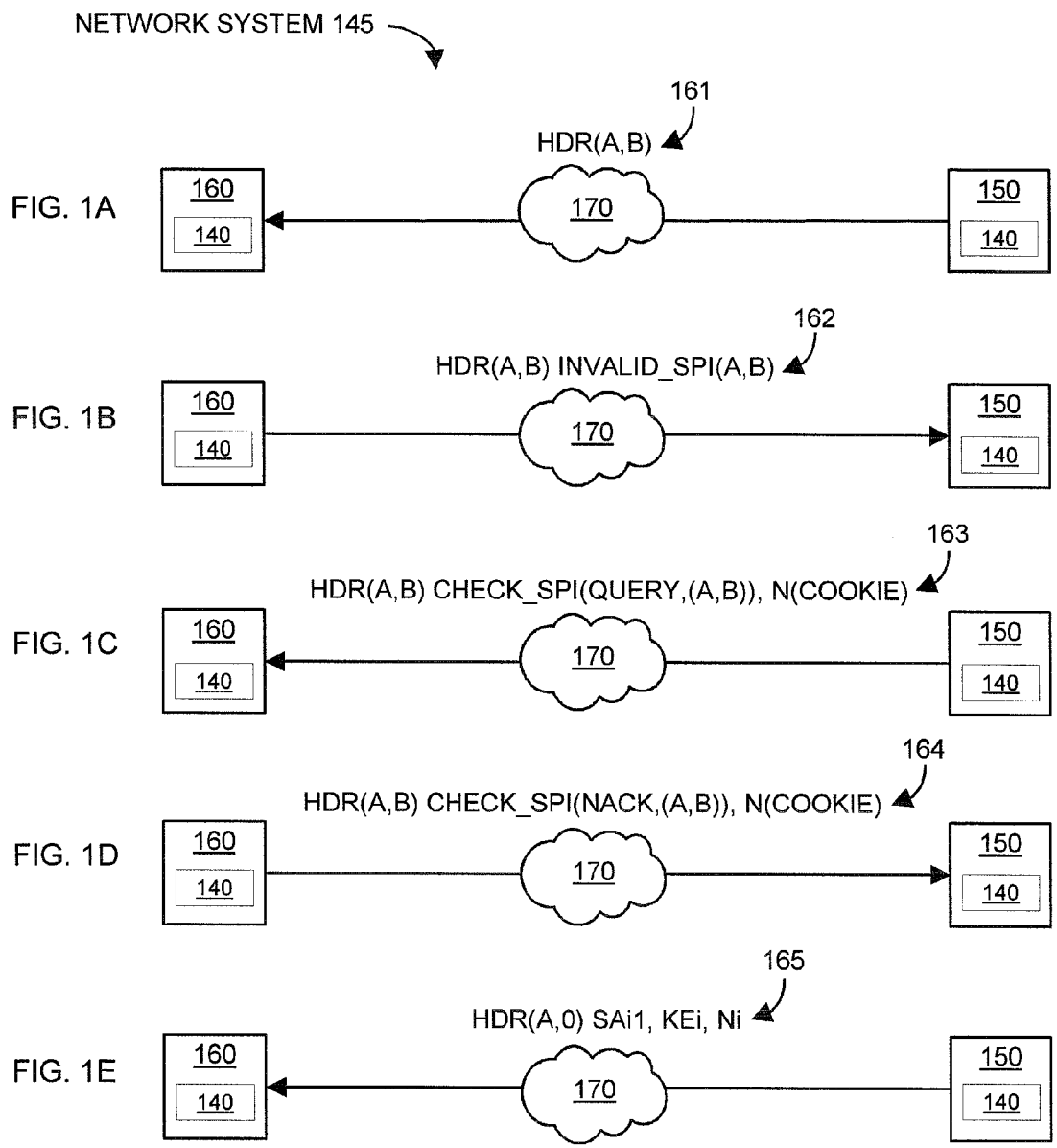
FIGS. 1A-1E represent block diagrams of network system implementing a verification function according to embodiments herein.
Figure 2:
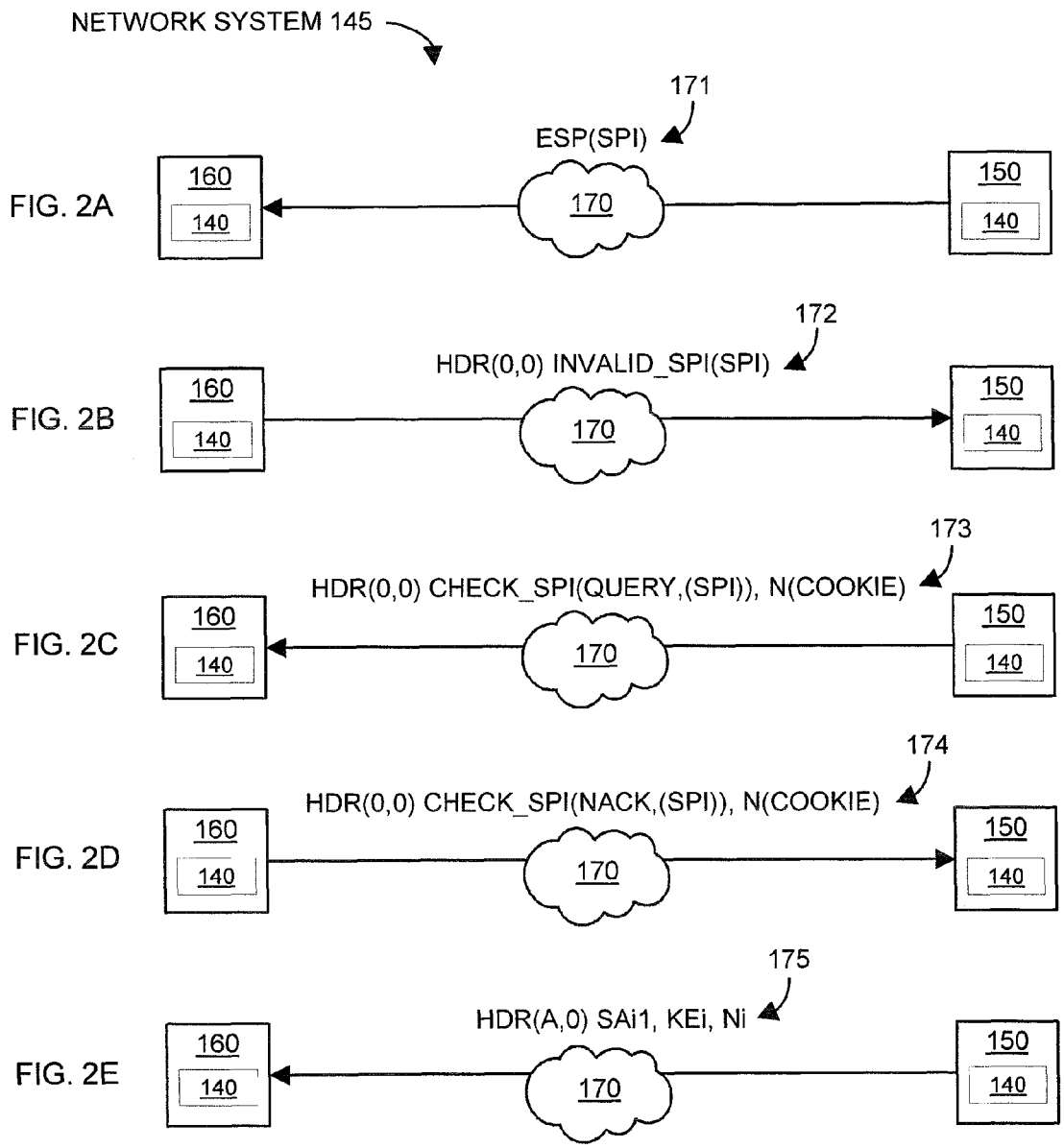
FIGS. 2A-2E represent block diagrams of network system implementing a verification function according to embodiments herein.
Figure 3:
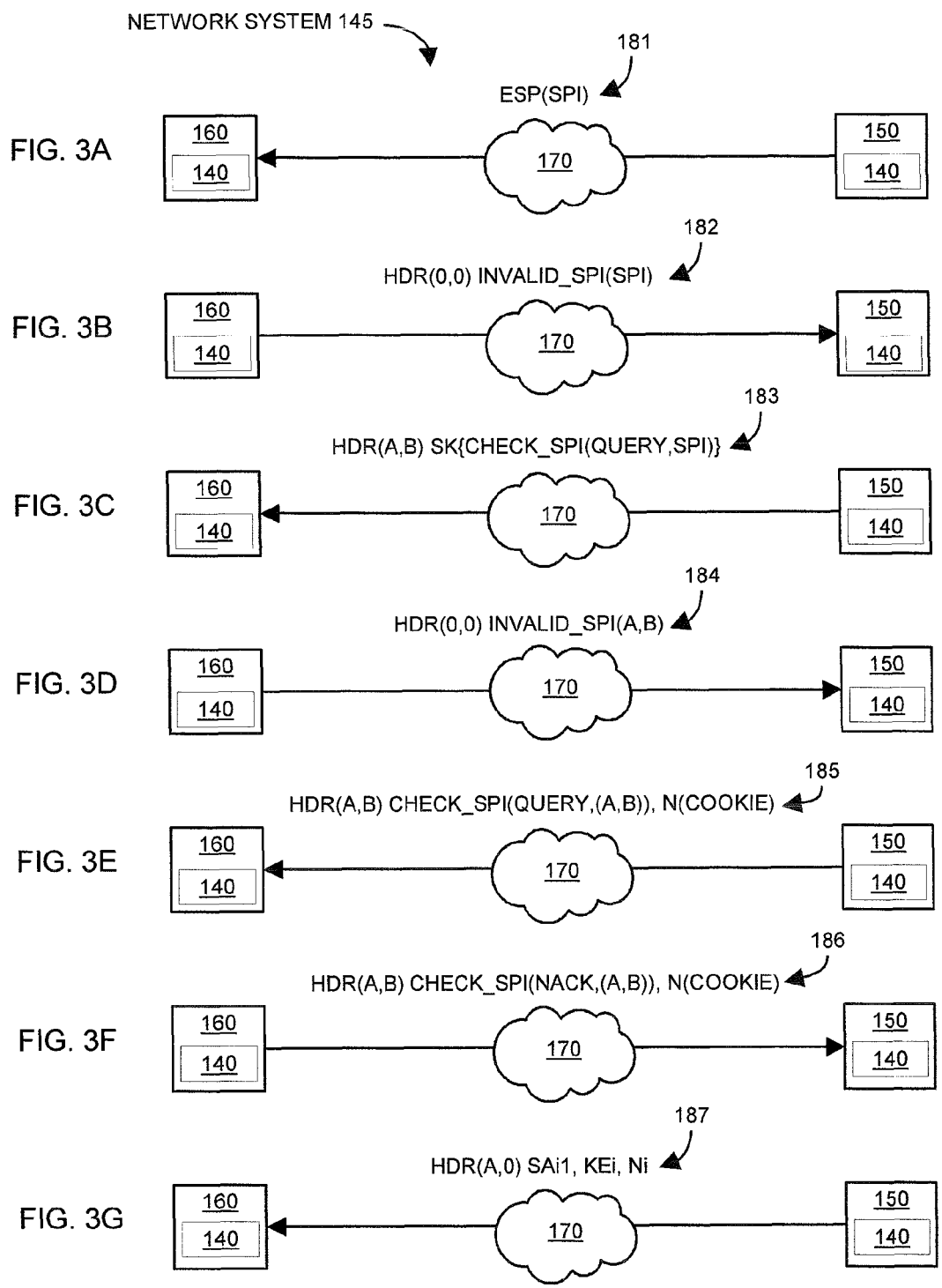
FIGS. 3A-3G represent block diagrams of network system implementing a verification function according to embodiments herein.
Figure 4:
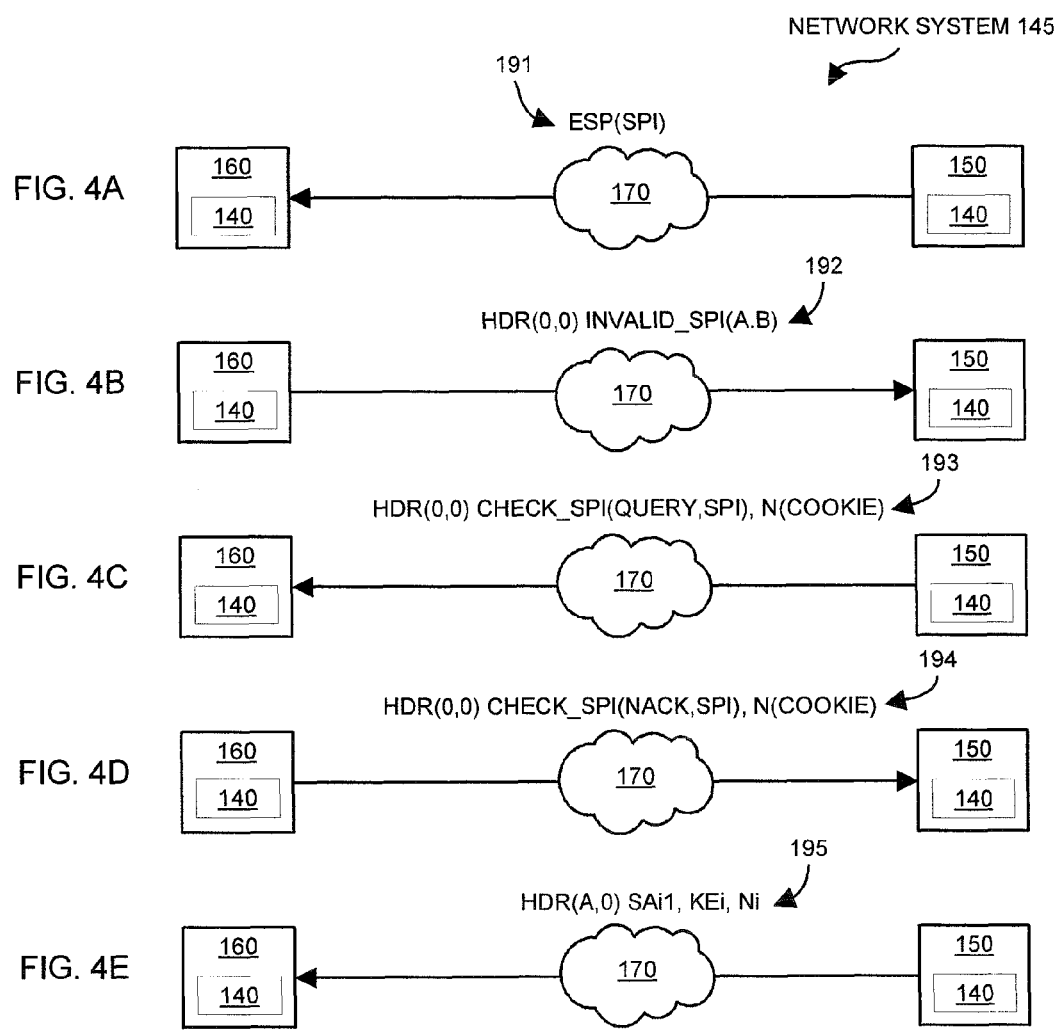
FIGS. 4A-4E represent block diagrams of network system implementing a verification function according to embodiments herein

In a general embodiment as discussed in more detail below in this detailed description, a verification process provides a safe and efficient mechanism for recovering security associations between network devices. More specifically, as in one general embodiment, the verification process transmits a secured message from a first network device to a second network device across a network. In such an embodiment, a previous security association had existed between the first network device and the second network device. Furthermore, the security association includes a parent process and a corresponding child process. The verification process detects, at the first network device, an incompatibility in the security association between the first network device and the second network device. The second network device transmits a notification to the first network device that specifies the security association incompatibility. The notification contains the protocol level (IKE or IPsec) and the security association identifier for the protocol. Next, the verification process transmits a status query from the first network device to the second network device in order to determine the status of the security association between the first network device and the second network device. In response to transmitting the status query, the verification process receives a verifiable reply message that is indicative of the status of the security association between the first network device and the second network device.

These and related embodiments will be discussed in more detail below.

DETAILED DESCRIPTION

Generally, conventional IKE/IPsec techniques for recovering from dangling security association occurrences suffer from a variety of deficiencies. In particular, one such deficiency is the lack of a fast and efficient IKE/IPsec method for recovering from a stale state (e.g., dangling security associations) where the security associations between two network devices have become incompatible. In the absence of a parent security association that enables a network device to send a reliable notification to a corresponding second network device with the dangling security association, the network devices can remain in a dangling security association state until, for example, the lingering security associations time out and new security associations can once again be renegotiated.

Furthermore, conventional mechanisms that attempt to resolve dangling security associations are typically vulnerable to flood-type denial of service attacks and/or are poll based. Thus, such conventional poll based solutions rely on the sending of probes that, in turn, depend on the presence of a continuous phase 1 security association (e.g., a parent and/or IKE security association) and may involve a lengthy recovery time. What's more, conventional approaches for recovering from dangling security associations can include sending proofs of desynchronization and liveliness. However, in such approaches it is difficult, in the absence of a secure and authenticated channel, for two gateways to demonstrate that they should have security associations in the event that the security associations have become incompatible (e.g., the security associations were lost, corrupted, etc.).

Embodiments disclosed herein overcome such deficiencies, as well as other deficiencies known in the art. For instance, example embodiments herein disclose methods and procedures for IKE/IPsec communications that enable network devices having dangling security associations to convey enough trust for renegotiation by providing hints of security association incompatibility. Thus, example embodiments take into account the basic principle that a potential attacker or hacker can exploit such a recovery procedure by tactics such as, for example, a flood-type denial of service attack.

Accordingly, embodiments disclosed herein consider the following guidelines in implementing a verification process for handling situations involving dangling security associations. The guidelines include, for example: i) the rekeying of security associations instead of deleting the security associations upon detection of an error, ii) allowing the network device that still has the security associations to renegotiate fresh security associations after a failure, iii) refraining from generating state when such a procedure can be avoided, and iv) reducing Central Processing Unit (CPU) costs associated with the recovery procedure.

Typically, rekeying is utilized so that the network device that has the intact security association also has the necessary information to rekey those security associations. This is particularly important for systems that build security associations dynamically; for example, there may not exist a specific security policy that explains how to build the security associations and it may not be obvious for the remote network device (e.g., the network device without the security associations or corrupted security associations) to determine which security policy generated the now dangling security association. Thus, by rekeying, the network device that has the intact security associations implicitly knows the particular security associations to rebuild.

The network device that wants to transmit data, or at least that pretends to have the security associations, has to demonstrate a 'willingness' to actually transmit the data. On the other hand, the network device that does not have security associations (e.g., has corrupted security associations) is not forced to negotiate anything (e.g., new IKE keys) it may not need. It is important to note that the initial effort of setting up timers, retransmitting, etc., is left to the network device that wants to transmit (e.g., typically the network device having the intact security associations).

Below are example embodiments that describe recovery procedure for various dangling security association scenarios that may arise in a network environment (e.g., the Internet).

Dangling Parent Security Associations

FIGS. 1A-1E depict an example embodiment of a network system 145 (generally referencing the systems for each of the FIGS. 1A-1E) comprising a first network device 150 and a second network device 160 that implement a verification function 140 for a dangling parent security association scenario. In this example embodiment, the phase 1 or parent security association is dangling such that second network device 160 does not have the parent security association. Note that in each of FIGS. 1A-1E, network devices 150 and 160 communicate across a network 170 (e.g., the Internet, Local Area Network (LAN), etc.).

Referring to the example embodiment of FIG. 1A, first network device 150 sends an IKE notify message 161 with an unknown Security Parameter Index (SPI) of (A,B) (e.g., HDR (A,B) as shown in FIG. 1A) to second network device 160. In this example, the SPI (A,B) is unknown to second network device 160 as a result of a dangling security association. In accordance with IKE/IPsec protocols, second network device 160 responds by sending an unprotected Invalid SPI notification message 162 to first network device 150 (shown in FIG. 1B). Even if a parent security association still exists with first network device 150, second network device 160 should still transmit an unprotected Invalid SPI notification message 162 since the risk exists that first network device 150 does not have that security association either. The result of second network device 160 sending a protected Invalid SPI message in FIG. 1B would likely result in a tight loop scenario if the first network device 150 still had an intact parent security association.

In order to deal safely with broken implementations of the invention (e.g., due to bugs or misunderstanding), and in order to limit the risk of denial of service attacks, the transmission of the Invalid SPI notification messages 162 is rate limited (e.g., sending once every 30 seconds) in accordance with an example embodiment. Rate limiting procedures are discussed in more detail below.

Referring now to FIG. 1C, upon receiving the unauthenticated, or unprotected, Invalid SPI notification message 162 (e.g., which references the conflicting IKE SPI message 161), first network device 150 performs the following steps. The first network device 150 verifies that (A,B) is indeed an active IKE SPI within its database. Next, network device 150 sends a notification check message 163 (e.g., CHECK_SPI (QUERY, (A,B) as shown in FIG. 1C) having a cookie payload (e.g., N(COOKIE) in FIG. 1C). Second network device 160 sends the notification check message 163 according to a rate limited procedure (e.g., once every 30 seconds). In response to receiving the notification check message 163, second network device 160 should not generate state. If the notification check message 163 gets lost in the network and is not received by second network device 160, and second network device 160 indeed does not have the IKE SPI (A,B), the process will start again at the next IKE SPI message 161 sent by first network device 150 to second network device 160.

In turn, the cookie associated with the notification check message 163 will be reflected (i.e., transmitted back to first network device 150) by second network device 160 without modification. The cookie contains enough information for first network device 150 to validate the reply. Thus, instead of second network device 160 having to generate any state in memory, the state information to validate the reply and to take action on the reply is stored on the network which, effectively, uses the network as a stack. Generation of cookies is discussed in more detail below.

Still referring to FIG. 1C, upon receiving the notification check message 163, second network device 160 searches for the security association of (A,B) in its parent security association database. If second network device 160 has the security association (A,B), an SPI Acknowledgment (ACK) message is sent to first network device 150 (e.g., HDR(A,B) CHECK_SPI(ACK,(A,B)) N(COOKIE)) that acknowledges that second network device 160 does in fact have the security association (A,B). Conversely, if second network device 160 does not have the security association (A,B) in its database, a Non-Acknowledgment (NACK) message 164 is sent to first network device 150 (e.g., CHECK_SPI(NACK,(A,B)) N(COOKIE) as shown in FIG. 1D). The NACK message 164 confirms with first network device 150 that second network device 160 does not have the security association (A,B). Note that ACK message and NACK message 164 both contain the same cookie that was sent by first network device 150 in the notification check message 163.

Referring to FIG. 1D, upon receiving the NACK message 164, first network device 150 ensures that the cookie associated with the NACK message 164 is valid. If the cookie is deemed invalid, first network device 150 drops the NACK message 164 and logs the incident. In one example embodiment, the logging of the receipt of the invalid NACK message 164 is rate limited. If, on the other hand, the cookie is valid and second network device 160 has confirmed ownership of the security association (A,B) (e.g., by sending an ACK message), first network device 150 logs a rate limited message which may suggest, for example, a race condition or an attack from a spoofing attacker (e.g., the spoofing attacker may have caused the Invalid SPI message 162 as shown in FIG. 1B).

Referring to the example embodiment of FIG. 1E, upon receiving the NACK 164 and confirming that the cookie associated with the NACK message 164 is valid, first network device 150 renegotiates the parent security association with second network device 160 by sending a renegotiation message 165 (e.g., "HDR(A,0) SAi1, KEi, Ni" as shown in FIG. 1E). Typically, as in one example embodiment, the parameters of the renegotiation are derived primarily from the security policy configuration and, if the security policy configuration is absent, the parameters are derived from the confirmed dangling security association.

Dangling Child Security Association

The recovery procedure for dangling child security associations is similar to the procedure described above with respect to dangling parent security associations. However, when dealing with a dangling child security association, protected notification messages are typically transmitted whenever possible.

FIGS. 2A-2E depict an example embodiment of a network system 145 (generally referencing the systems for each of the FIGS. 2A-2E) comprising a first network device 150 and a second network device 160 that implement a verification function 140 for a dangling child security association scenario. In this example embodiment, the phase 2 or child security association is dangling such that second network device 160 does not have the child security association. It should be noted that in each of FIGS. 2A-2E, network devices 150 and 160 communicate across a network 170 (e.g., the Internet, Local Area Network (LAN), etc.).

In the example embodiment of FIG. 2A, first network device 150 sends an Encapsulating Security Protocol (ESP) message 171 to second network device 160. Note that in other example embodiments, first network device 150 can instead send an Authentication Header (AH) message or any type of traffic with a negotiated SPI/phase 2 security association to second network device 160.

In response to receiving the ESP message 171 (as shown in FIG. 2B), second network device 160 sends an unprotected Invalid SPI message 172 to first network device 150 to indicate to first network device 150 that second network device 160 does not have the child security association. In this embodiment, Invalid SPI message 172 contains the SPI of the invalid message (e.g., ESP message 171). Further, as in one embodiment, second network device 160 sends the Invalid SPI message 172 to first network device 150 in accordance with a rate limited procedure (e.g., once every 30 seconds).

Similar to the previously discussed dangling parent security association scenario, upon receiving the Invalid SPI message 172, first network device 150 verifies whether it owns the offending child security association and, if so, first network device 150 further ensures that the Invalid SPI message 172 is not a spoofed packet from an attacker.

In FIG. 2C, in response to receiving the Invalid SPI message 172, first network device 150 sends a notification check message 173 (e.g., HDR(0,0) CHECK_SPI(QUERY, (SPI) as shown in FIG. 2C) followed by a cookie payload (e.g., N(COOKIE) in FIG. 2C).

According to one example embodiment, first network device 150 and second network device 160 share a parent security association and, thus, first network device 150 sends a protected notification check message 173 to second network device 160. If second network device 160 can validate the protected notification check message 173 upon its receipt, this validation suggests either a logic error on second network device 160 as it should have sent the Invalid SPI message 172 as a protected message or, as an alternative explanation, the Invalid SPI message 172 that led to the notification check message 173 has been spoofed by some other entity (or there was a race condition in an earlier exchange). Thus, as in one example embodiment, second network device 160 identifies which erroneous condition(s) has occurred (e.g., by checking that the SPI is in the child security association database) and issues a message about a possible security alert (e.g., to a network administrator).

Assume for this next example embodiment that first network device 150 and second network device 160 do not share a parent security association and, thus, first network device 150 sends an unprotected notification check message 173 with a cookie to second network device 160. Upon receipt of the unprotected notification check message 173, second network device 160 verifies whether it owns the SPI referenced in the notification check message 173. If second network device 160 does own the SPI, second network device 160 sends an ACK message 174 (e.g., CHECK_SPI(ACK, SPI)) to first network device 150 with the same cookie payload that was in the notification check message 173.

Alternatively, if second network device 160 does not own the SPI, second network device 160 confirms the absent SPI with first network device 150 by sending a NACK message 174 (e.g., HDR(0,0) CHECK_SPI(NACK, SPI)) as shown in FIG. 2D. Note that in one embodiment the transmissions of the notification check messages 173 and NACK messages 174 are rate limited (e.g., once every 30 seconds). Further, in one example embodiment, the rate limited messages are sent on a per peer basis to avoid incurring state creation by the sender of the messages.

Referring now to FIG. 2E, upon receiving the NACK message 174, first network device 150 validates the cookie payload. If the cookie is deemed valid, first network device 150 rekeys the child security association with second network device 160 by sending a rekey message 175 (e.g., HDR(A,0) SAi1, KEi, Ni as shown in FIG. 2E). In an additional embodiment, upon receiving an ACK message from second network device 160 and validating the cookie, first network device 150 issues an error message to notify a network administrator about a possible security alert (e.g., a spoofing attacker may have caused the Invalid SPI message 162 as shown in FIG. 2B).

Typical Dangling Security Association Scenarios

The following example embodiments describe typical dangling security association scenarios that can occur in a network environment 145.

FIGS. 3A-3G depict an example embodiment of a network system 145 (generally referencing the systems for each of the FIGS. 3A-3G) comprising a first network device 150 and a second network device 160 that implement a verification function 140 for a dangling child security association scenario. In this example embodiment, the phase 2 or child security association is dangling such that second network device 160 does not have the child security association. Furthermore, first network device 150 still has both the child and parent security associations intact. Note that in each of FIGS. 3A-3G, network devices 150 and 160 communicate across a network 170 (e.g., the Internet, Local Area Network (LAN), etc.).

In the example embodiment of FIG. 3A, first network device 150 sends an ESP message 181 to second network device 160. Note that in other example embodiments, first network device 150 can instead send an Authentication Header (AH) message or any type of traffic with a negotiated SPI/phase 2 security association to second network device 160.

In response to receiving the ESP message 181 (as shown in the example embodiment of FIG. 3B), second network device 160 sends an unprotected Invalid SPI message 182 to first network device 150 to indicate to first network device 150 that second network device 160 does not have the child security association. In this embodiment, Invalid SPI message 182 contains the SPI of the invalid message (e.g., ESP message 181). Further, as in one embodiment, second network device 160 sends the Invalid SPI message 182 to first network device 150 in accordance with a rate limited procedure (e.g., once every 30 seconds).

In FIG. 3C, in response to receiving the Invalid SPI message 182, the first network device 150 transmits a secured status message 183 (shown in FIG. 3C wherein the secured data is indicated by the "SK{ }") to the second network device 160 in order to verify the child process of the security association. As per one example embodiment, the first network device 150 transmits the secured message 183 in accordance with the previous security association parameters between the first network device and the second network device (e.g., in accordance with the (A,B) security parameters).

Referring now to the example embodiment of FIG. 3D, the second network device 160 transmits an unsecured message 184 indicating that the second network device 160 does not have the parent (or phase 1 or IKE) process of the security association.

As shown in the example embodiment of FIG. 3E, the first network device 150 sends an unsecured status query 185 to the second network device 160. In this particular embodiment, the unsecured status query 185 is not secured by IKE/IPsec. Furthermore, the unsecured status query 185 contains a cookie for verifying any corresponding reply messages.

In FIG. 3F, the second network device 160 sends a verifiable reply message 186 to the first network device 150 to indicate that the second network device 160 does not have the parent process of the security association. Thus, as shown in the example embodiment of FIG. 3F, the verifiable reply message 186 contains the NACK identifier to indicate that the second network device does not own the parent security association.

FIG. 3G shows an example embodiment where, upon determining that the cookie is valid, the first network device 150 renegotiates the security association with the second network device 160 by transmitting a renegotiation message 187 to the second network device 160. Note that the renegotiation of the security association between the network devices is in accordance with IKE/IPsec renegotiation and rekeying techniques already known in the art.

Details of the verification function 140 processing with regard to the example embodiments of FIGS. 3A-3G are described in more detail below in conjunction with the discussion of Flowcharts 5-9.

FIGS. 4A-4E depict still another example embodiment of a network system 145 (generally referencing the systems for each of the FIGS. 4A-4E) comprising a first network device 150 and a second network device 160 that implement a verification function 140 for a dangling parent and child security association scenario. In this example embodiment, the phase 1 (or parent) and phase 2 (or child) security associations are dangling such that second network device 160 has neither the parent nor child security association. Furthermore, first network device 150 still has the child security association intact and does not have the parent security association according to this particular embodiment. Note that in each of FIGS. 4A-4E, network devices 150 and 160 communicate across a network 170 (e.g., the Internet, Local Area Network (LAN), etc.).

Referring to the example embodiment of FIG. 4A, first network device 150 sends an ESP message 191 to second network device 160. Note that in other example embodiments, first network device 150 can instead send an Authentication Header (AH) message or any type of traffic with a negotiated SPI/phase 2 security association to second network device 160.

In response to receiving the ESP message 191 (as shown in the example embodiment of FIG. 4B), second network device 160 sends an unprotected Invalid SPI message 192 to first network device 150 to indicate to first network device 150 that second network device 160 does not have the child security association. In this embodiment, Invalid SPI message 192 contains the SPI of the invalid message (e.g., ESP message 191). Further, as in one embodiment, second network device 160 sends the Invalid SPI message 192 to first network device 150 in accordance with a rate limited procedure (e.g., once every 30 seconds).

In the example embodiment of FIG. 4C, the first network device 150 sends the unsecured status query 193 to the second network device 160, wherein the unsecured status query 193 is not secured by IKE/IPsec. The unsecured status query 193 also contains a cookie for verifying any corresponding reply messages.

Referring to the example embodiment of FIG. 4D, the second network device 160 transmits a verifiable reply messages 194 to first network device 150. In turn, the first network device 150 can authenticate the verifiable reply message 194 by processing the cookie associated with the messages, as previously described. The status of the security association is identified in verifiable reply messages by either an Acknowledgment (ACK) or Non-Acknowledgment (NACK) identifier which indicates whether the second network device either 160 has or does not have the corresponding security association, respectively. In the example embodiment of FIG. 4D, verifiable reply message 194 contains the NACK identifier indicating that the second network device 160 does not have the corresponding security association.

According to the example embodiment of FIG. 4E, upon determining that the cookie is valid, the first network device 150 renegotiates the security association with the second network device 160 by transmitting a renegotiation message 195 to the second network device 160. Note that the renegotiation of the security association between the network devices is in accordance with IKE/IPsec renegotiation and rekeying techniques already known in the art.

Details of the verification function 140 processing with regard to the example embodiments of FIGS. 4A-4E are described in more detail below in conjunction with the discussion of Flowcharts 5-9.

Cookie Generation and Validation

Typically, the cookie information is chosen by the network device that transmits the cookie. As such, the particular cookie data has strictly no meaning for the remote peer (e.g., second network device 160 in the above examples) and can thus be chosen as seen fit. For example, when first network device 150 sends an unauthenticated notification check message, the cookie payload following the CHECK_SPI notify is computed as follows:

$$\text{Cookie} = tH(k(t)|\text{Invalid SPI}(\ldots,\text{Query})$$
$$|ip.src|ip.dst|udp.src,|udp.dst)$$

where:
't' represents the time at which the cookie was computed
k(t) is a timed key, local to the emitter. The key is time dependent.
Invalid SPI ( . . . , Query) is the content of the Invalid SPI notify payload where the operation bit has been set to "Query"
ip.src is the source Internet Protocol (IP) address of the IKE packet
ip.dst is the destination IP address of the IKE packet
udp.src is the source User Datagram Protocol (UDP) post of the IKE packet
udp.dst is the destination UDP port of the IKE packet
H is a one way function or hash algorithm (e.g. Message-Digest Algorithm 5 "MD5", Secure Hash Algorithm "SHA", etc.)

Other methods of computing the cookies are acceptable and interchangeable as long as they can only be generated and verified by the sender.

In operation, the network device finds k(t) based on 't' and replaces the operation field with "Query" again. The network device can then recompute the cookie value and compare that value to the one just received. If both values are identical, the ACK or NACK message is processed by the network device.

In order to minimize the range of cryptographic attacks on k(t), messages have a should have a limited time scope. According to an example embodiment, if too much time has elapsed between time 't' and the time referenced in the cookie payload, the receiving network device does not try to validate the cookie.

Throttling and Dampening

An important element of the security in IKE recovery relies on the limitation of CPU utilization. In order to thwart flood-type denial of service attacks, strict rate limiting and throttling mechanisms are enforced. Typically, as in one example embodiment, all the notification messages (e.g., notification check messages and NACK messages) that are exchanged during IKE recovery are rate limited. Details of rate limited procedures are discussed in more detail below.

Invalid SPI Throttling

In one example embodiment, the transmission of all Invalid SPI messages are rate limited. Rate limiting is preferably performed on a per peer basis to avoid dynamic state creation at the network devices. A recommended tradeoff is to limit the number of flows that can undergo recovery at one point in time and avoid sending Invalid SPI messages for flows that are potentially already under recovery.

Invalid SPI rate limiting protects against natural dangling security association occurrences. For example, normal traffic conditions may cause unrecognized SPI's to be received and, thus, the Invalid SPI messages are the most important to protect. Indeed, it is not realistic to send one Invalid SPI notification for every unrecognized ESP message that is received. For example, on high speed links, thousands of Invalid SPI message could be transmitted for the same offending SPI.

According to an example embodiment, the receipt of unauthenticated Invalid SPI messages are also rate limited. Again, the rate limiting is preferably performed on a per peer basis to avoid dynamic state creation. In normal circumstances, the network device receiving the Invalid SPI messages has a security association with the network device that sent the Invalid SPI messages and already maintains peer-related data structures that can help in maintaining adequate counters.

It should be noted that authenticated Invalid SPI messages can be accepted by a network device without throttling.

Check SPI Throttling

In an example embodiment, the receipt of unauthenticated notification check messages is rate limited. Similar to above, the rate limiting is preferably performed on a per peer basis to avoid dynamic state creation. Again, a flow based limiting is a recommended tradeoff.

Note that if the rate limiting counters and timers are shared between Invalid SPI message and notification check message reception, the implementation takes into account that an ACK or NACK is likely to be received shortly after an Invalid SPI message is received. Thus, this rate limiting is necessary to prevent flood-type denial of service attacks based on unauthenticated notification check messages. Additionally, the rate limiting procedures can save the receiving network device from having to entirely parse the message and from having to perform a search in the security association database.

Dampening

A network device can be dampened by ignoring certain messages for a predetermined period of time. Typically, dampening occurs after one of the following conditions:
the recovery of one or more security associations
the failure in recovering a security association owned by the local security gateway
the logging of an error or warning message involving a security association owned by the local security gateway Dampening generally involves disregarding Invalid SPI messages and notification check messages. Dampening can prevent a man-in-the-middle from forcing the fast re-creation of security associations and potentially depleting the entropy of systems under attack.

FIGS. 5-9 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention. It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 5:
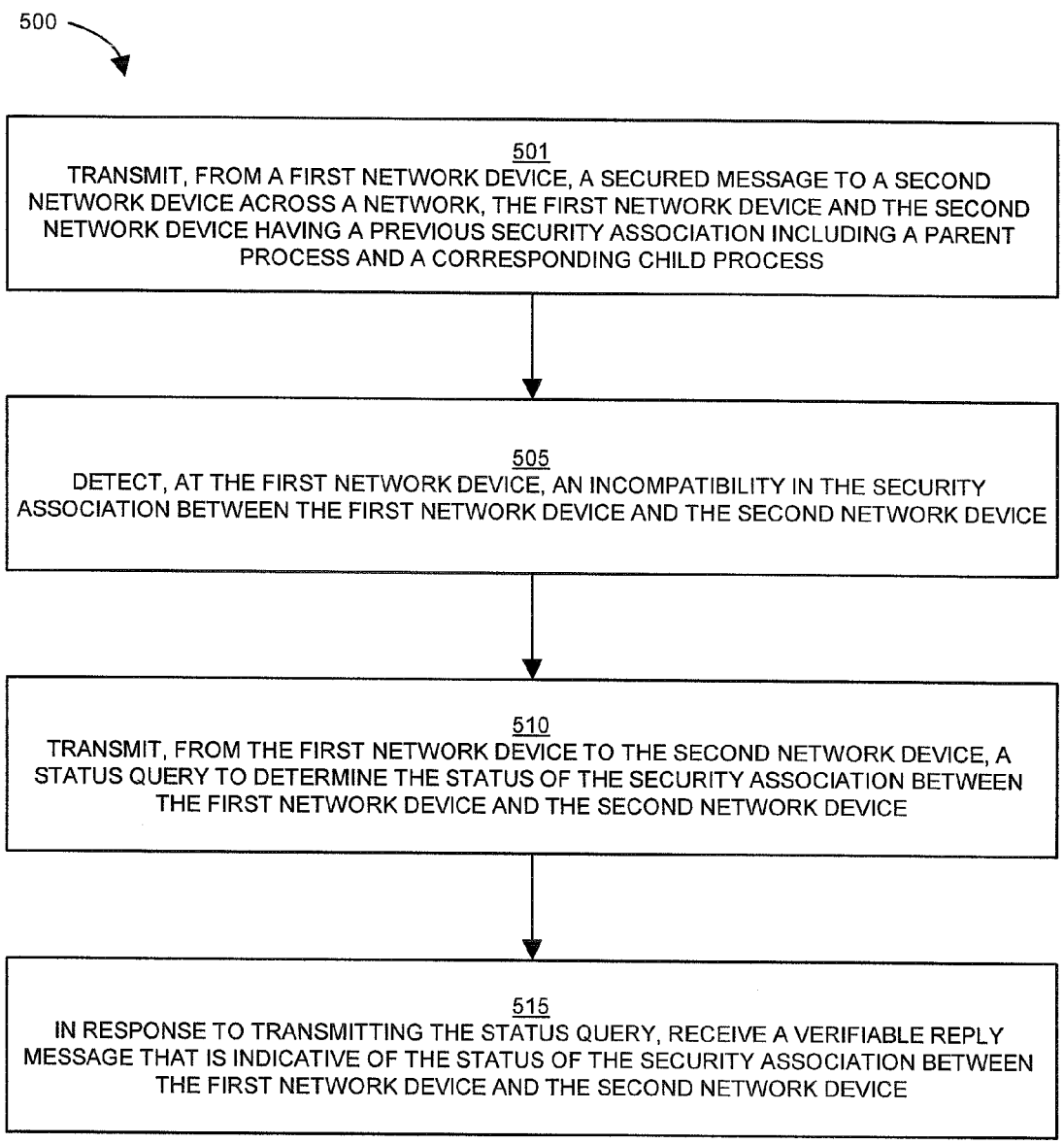
FIG. 5 is a flow chart of example processing steps performed by the verification function according to embodiments herein.

Now, more specifically, FIG. 5 is a flow chart 500 of example processing steps performed by a verification function according to embodiments herein.

In step 501, the verification function 140 transmits, from a first network device 150, a secured message (e.g., secured message 181 in FIG. 3A and secured message 191 in FIG. 4A) to a second network device 160 across a network 170. In this example embodiment, it is assumed that the first network device 150 and the second network device 160 had a previous security association that included a parent process and a corresponding child process. Referring to FIGS. 3A and 4A, first network device 150 transmits secured messages 181 and 191, respectively, to second network device 160. The secured messages 181 and 191 are secured according to the IKE/IPsec protocols.

In step 505, the verification function 140 detects, at the first network device 150, an incompatibility in the security association between the first network device 150 and the second network device 160. For example, in FIG. 3A the incompatibility of the security association is due to the fact that the second network device 160 does not have the security association (parent and child) while the first network device 150 still has the security association (both parent and child) intact. Likewise, in FIG. 4A the incompatibility of the security association is due to the fact that the second network device 160 does not have the security association (parent and child) while the first network device 150 still has the security association (only the child process in this case).

In step 510, the verification function 140 transmits, from the first network device 150, a status query (e.g., unsecured status query 185 in FIG. 3E and unsecured status query 193 in FIG. 4C) to the second network device 160 in order to determine the status of the security association between the first network device 150 and the second network device 160.

As shown in the example embodiment of FIG. 3E, the first network device 150 sends the unsecured status query 185 to the second network device 160, wherein the unsecured status query 185 is not secured by IKE/IPsec. Furthermore, the unsecured status query 185 contains a cookie for verifying any corresponding reply messages. Similarly, in FIG. 4C, the first network device 150 sends the unsecured status query 193 to the second network device 160, wherein the unsecured status query 193 is not secured by IKE/IPsec. The unsecured status query 193 also contains a cookie for verifying any corresponding reply messages.

In step 515, in response to transmitting the status query (e.g., unsecured status query 185 in FIG. 3E and unsecured status query 193 in FIG. 4C), the verification function 140 receives a verifiable reply message (e.g., verifiable reply message 186 in FIG. 3F and verifiable reply message 194 in FIG. 4D) that is indicative of the status of the security association between the first network device 150 and the second network device 160.

For instance, in the example embodiments of FIGS. 3F and 4D, the second network device 160 transmits verifiable reply messages 186 and 194, respectively, to first network device 150. In turn, the first network device 150 can authenticate the verifiable reply messages 186 and 194 by processing the cookie associated with the messages, as previously described. The status of the security association is identified in verifiable reply messages by either an Acknowledgment (ACK) or Non-Acknowledgment (NACK) identifier which indicates whether the second network device 160 either has or does not have the corresponding security association, respectively. In the example embodiments of FIGS. 3F and 4D, the verifiable reply messages 186 and 194 contain the NACK identifier indicating that the second network device 160 does not have the corresponding security association.

Figure 6:
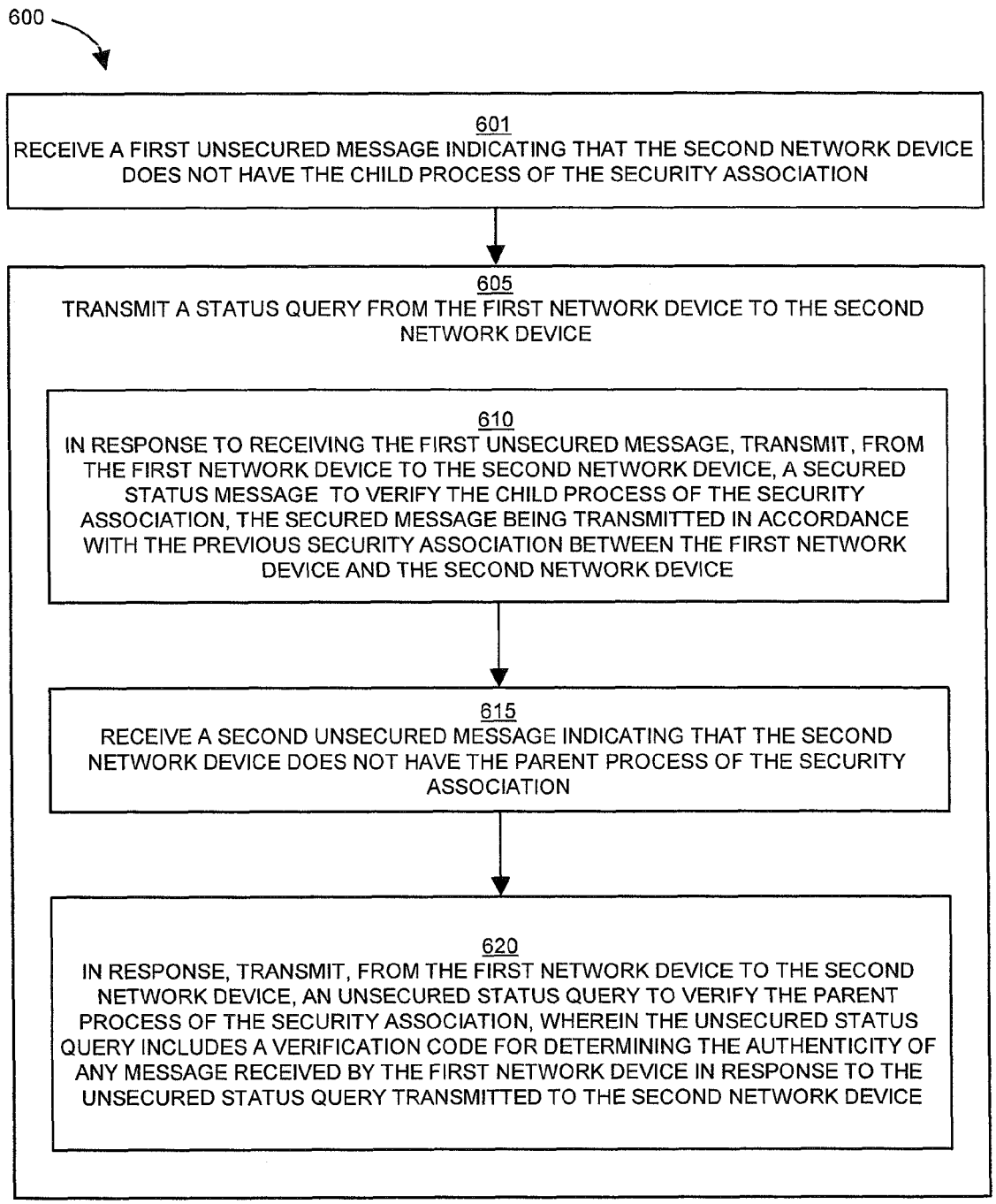
FIG. 6 is a flow chart of example processing steps performed by the verification function according to embodiments herein.

FIG. 6 is a flow chart 600 of example processing steps performed by the verification function 140 according to embodiments herein.

In step 601, the verification function 140 receives an unsecured message (e.g., unsecured messages 182 and 184 in FIGS. 3B and 3D, respectively, and unsecured message 192 in FIG. 4B) indicating that the second network device 160 does not have the child process of the security association.

In step 605, the verification function 140 transmits, from the first network device 150, a status query (e.g., unsecured status query 193 shown in FIG. 4C) to the second network device 160. Processing of step 605 is similar to the processing of previously described step 510.

In step 610, in response to receiving the unsecured message 192, the verification function 140 transmits, from the first network device 150, a secured status message 183 (shown in FIG. 3C wherein the secured data is indicated by the "SK{ }") to the second network device 160 in order to verify the child process of the security association. As per one example embodiment, the first network device 150 transmits the secured message 183 in accordance with the previous security association parameters between the first network device and the second network device (e.g., in accordance with the (A,B) security parameters).

In step 615, the verification function 140 receives an unsecured message 184 (shown in FIG. 3D) indicating that the second network device 160 does not have the parent (or phase 1 or IKE) process of the security association. As an example, FIG. 3D shows the second network device 160 transmitting an unsecured message 184 (e.g., HDR(0,0) INVALID_SPI (A,B)) to first network device 150 to indicate the absence of the parent security association in the second network device 160.

In step 620, the verification function 140 transmits, from the first network device 150, an unsecured status query 185 to the second network device 160 in order to verify the parent process of the security association. In an example embodiment, the unsecured status query 185 includes a verification code (e.g., a cookie) for determining the authenticity of any message received by the first network device 150 in response to the unsecured status query 185 transmitted to the second network device 160.

Figure 7:
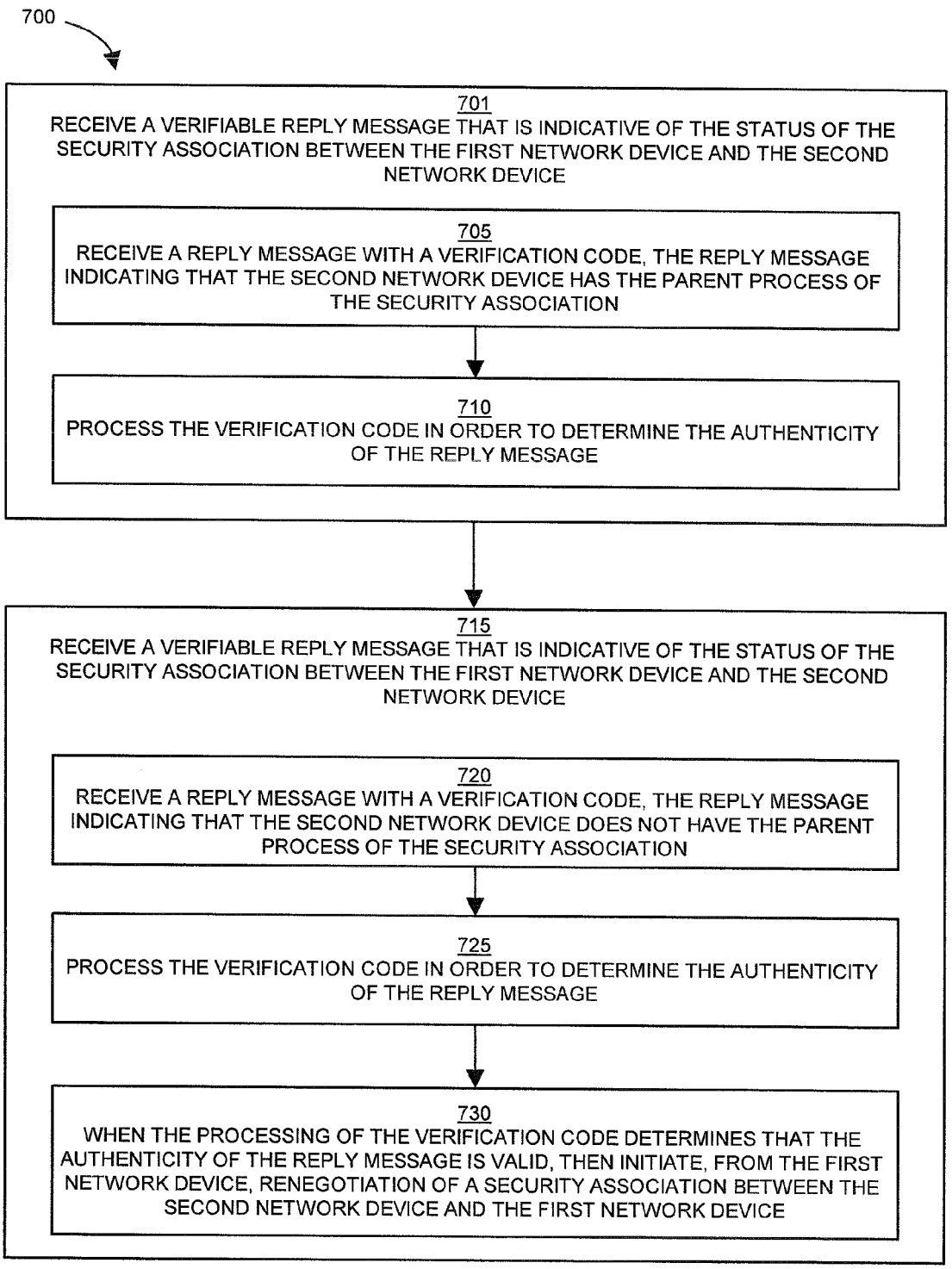
FIG. 7 is a flow chart of example processing steps performed by the verification function according to embodiments herein.

FIG. 7 is a flow chart 700 of example processing steps performed by the verification function 140 according to embodiments herein.

In step 701, the verification function 140 receives a verifiable reply message that is indicative of the status of the security association between the first network device 150 and the second network device 160. Processing of step 701 is similar to the processing of previously described step 515.

In step 705, the verification function 140 receives a reply message with a verification code (e.g., a cookie). In an example embodiment, the verifiable reply message indicates that the second network device 160 has the parent process of the security association. As such, the verifiable reply message contains the ACK identifier to acknowledge ownership of the parent security association by the second network device 160.

In step 710, the verification function 140 processes the verification code in order to determine the authenticity of the reply message. Thus, as in one example embodiment, the verification function 140 processes, at the first network device 150, the cookie that was received as part of the verifiable reply message transmitted by the second network device 160.

In step 715, the verification function 140 receives verifiable reply messages 186 and 194 (shown in FIGS. 3F and 4D, respectively) that are indicative of the status of the security association between the first network device and the second network device.

In step 720, the verification function 140 receives a reply message with a verification code (e.g., cookie). As per an example embodiment, the verifiable reply message 186 indicates that the second network device 160 does not have the parent process of the security association. Thus, as shown in FIG. 3F, the verifiable reply message 186 contains the NACK identifier to indicate that the second network device does not own the parent security association. Likewise, FIG. 4D shows the verifiable reply message 194 contains the NACK identifier to indicate that the second network device does not own the child security association.

In step 725, the verification function 140 processes the verification code (e.g., cookie) in order to determine the authenticity of the reply message. Processing of step 725 is similar to the processing of step 710.

In step 730, when the processing of the verification code (e.g., cookie) determines that the authenticity of verifiable reply messages 186 and 194 are valid, the verification function 140 then initiates renegotiation of a security association between the first network device 150 and the second network device 160.

FIG. 3G shows an example embodiment where, upon determining that the cookie is valid, the verification function 140 renegotiates the security association with the second network device 160 by transmitting a renegotiation message 187 from the first network device 150 to the second network device 160. Note that the renegotiation of the security association between the network devices is in accordance with IKE/IPsec renegotiation and rekeying techniques already known in the art.

Similarly, FIG. 4E shows an example embodiment where, upon determining that the cookie is valid, the verification function 140 renegotiates the security association with the second network device 160 by transmitting a renegotiation message 195 from the first network device 150 to the second network device 160. Note that the renegotiation of the security association between the network devices is in accordance with IKE/IPsec renegotiation and rekeying techniques already known in the art.

Figure 8:
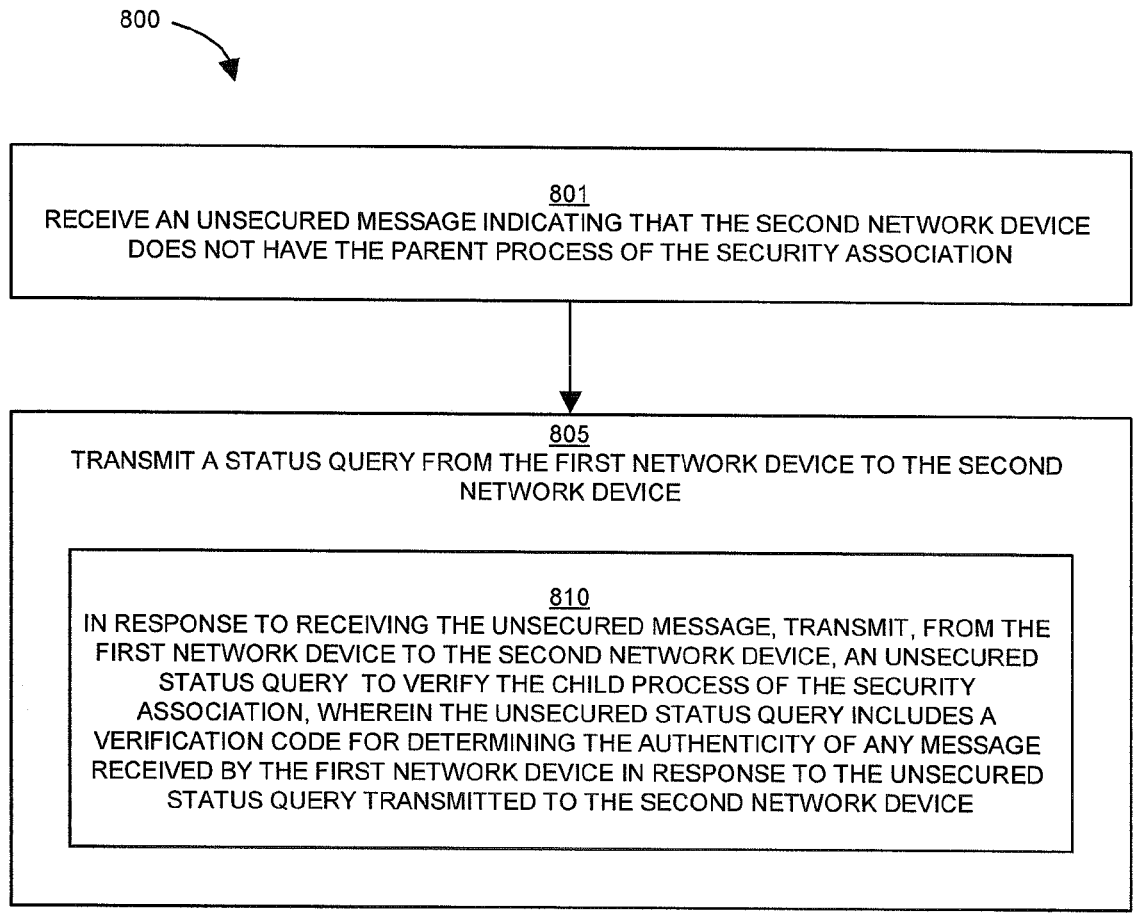
FIG. 8 is a flow chart of example processing steps performed by the verification function according to embodiments herein.

FIG. 8 is a flow chart 800 of example processing steps performed by the verification function 140 according to embodiments herein.

In step 801, the verification function 140 receives an unsecured message 192 (shown in FIG. 4B) indicating that the second network device 160 does not have the parent process of the security association. The example embodiment of FIG. 4B shows second network device 160 transmitting the unsecured message 192 (e.g., HDR(0,0) INVALID_SPI(A.B)) to the first network device 150 to indicate the absence of the parent process of the security association at the second network device 160.

In step 805, the verification function 140 transmits, from the first network device 150, a status query (e.g., unsecured status query 193) to the second network device 160.

In step 810, in response to receiving the unsecured message 192, the verification function 140 transmits, from the first network device 150, an unsecured status query 193 to the second network device 160 in order to verify the child process of the security association. According to an example embodiment, the unsecured status query 193 includes a verification code (e.g., a cookie) for determining the authenticity of any message received by the first second network device 160 in response to the unsecured status query 193 transmitted to the second network device 160.

Figure 9:
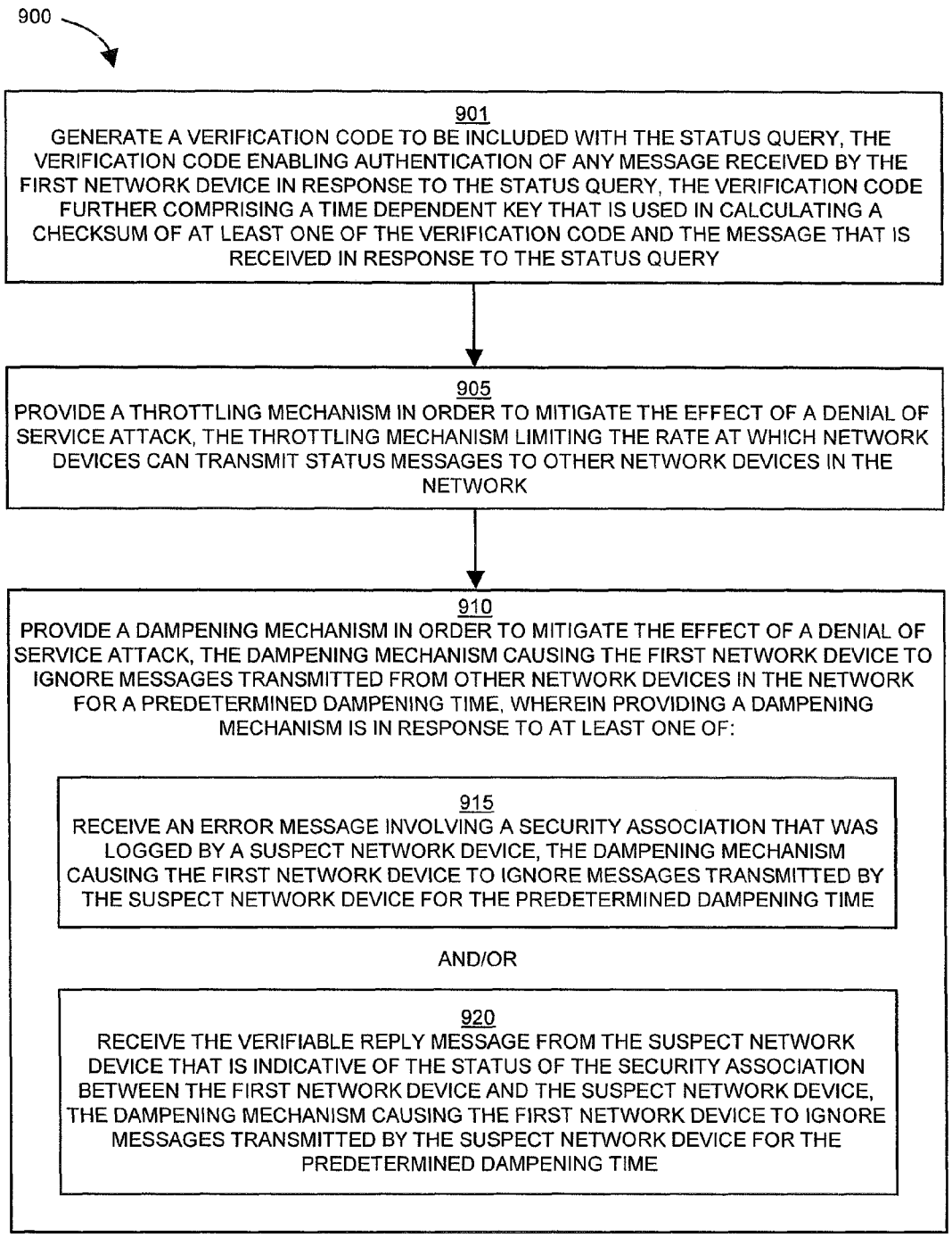
FIG. 9 is a flow chart of example processing steps performed by the verification function according to embodiments herein.

FIG. 9 is a flow chart 900 of example processing steps performed by the verification function 140 according to embodiments herein.

In step 901, the verification function 140 generates a verification code (e.g., cookie) to be included with the status query (e.g., unsecured status query 185 of FIG. 3E and unsecured status query 193 of FIG. 4C). In this example embodiment, the verification code, or cookie, enables authentication of any message received by the first network device 150 in response to the status query. Additionally, the verification code (e.g., cookie) comprises a time dependent key that is used in calculating a checksum of the verification code and/or the message that is received in response to the status query.

In step 905, the verification function 140 provides a throttling mechanism in order to mitigate the effect of a denial of service attack. In this manner, the throttling mechanism limits the rate at which network devices can transmit status messages to other network devices in the network 170 (e.g., limiting the rate of sending status message to once every 30 seconds).

In step 910, the verification function 140 provides a dampening mechanism in order to mitigate the effect of a denial of service attack. In an example embodiment, the dampening mechanism causes the first network device 150 to ignore messages transmitted from other network devices (e.g., second network device 160) in the network 170 for a predetermined dampening time. Steps 915 and 920 describe example causes that can trigger the dampening mechanism.

In step 915, the verification function 140 receives an error message involving a security association that was logged by a suspect network device. The dampening mechanism causes the first network device 150 to ignore messages transmitted by the suspect network device for a predetermined dampening time (e.g., 10 seconds).

In step 920, the verification function 140 receives a verifiable reply message from a suspect network device that is indicative of the status of the security association between the first network device 150 and the suspect network device. As a result, the dampening mechanism causes the first network device 150 to ignore messages transmitted by the suspect network device for a predetermined dampening time.

Figure 10:
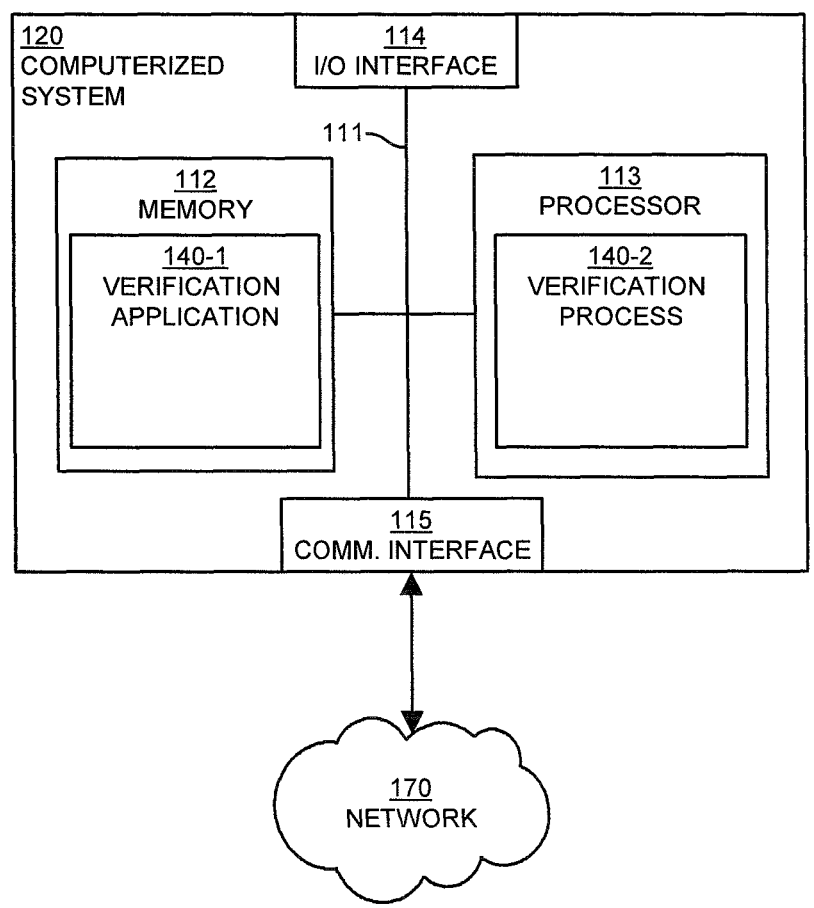
FIG. 10 is a block diagram illustrating an example computerized device system for implementing a verification function according to embodiments herein.

FIG. 10 is a block diagram illustrating an example computer system 120 (e.g., first network device 150 and/or second network device 160 as shown in FIGS. 1-4) for implementing verification function 140 and/or other related processes to carry out the different functionality as described herein. Computer system 120 can be a computerized device such as a provider edge router, multi-service edge node, hub, gateway, access point, computer, workstation, processing device, etc.

As shown, computer system 120 of the present example includes an interconnect 111 that couples a memory system 112 and a processor 113 an input/output interface 114, and a communications interface 115. FIG. 10 shows the computer system 120 connected to the network 170 via the communications interface 115.

As shown, memory system 112 is encoded with verification application 140-1. Verification application 140-1 can be embodied as software code such as data and/or logic instructions (e.g., code stored in the memory or on another computer readable medium such as a disk) that support functionality according to different embodiments described herein.

During operation, processor 113 of computer system 120 accesses memory system 112 via the interconnect 111 in order to launch, run, execute, interpret or otherwise perform the logic instructions of the verification application 140-1. Execution of verification application 140-1 produces processing functionality in verification process 140-2. In other words, the verification process 140-2 represents one or more portions of the verification application 140-1 (or the entire application) performing within or upon the processor 113 in the computer system 120.

It should be noted that, in addition to the verification process 140-2, embodiments herein include the verification application 140-1 itself (i.e., the un-executed or non-performing logic instructions and/or data). The verification application 140-1 can be stored on a computer readable medium such as a floppy disk, hard disk, or optical medium. The verification application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of verification application 140-1 in processor 113 as the verification process 140-2. Those skilled in the art will understand that computer system 120 can include other processes and/or software and hardware components, such as an operating system that controls allocation and use of hardware resources associated with the computer system 120.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What I claim is:

1. A method comprising:
    transmitting, from a first network device, a secured message to a second network device across a network, the first network device and the second network device having a security association including a parent process and a corresponding child process;
    detecting, at the first network device, an incompatibility in the security association between the first network device and the second network device;
    in response to detecting the incompatibility in the security association, transmitting, from the first network device, a status query to the second network device in order to verify whether at least part of the security association is already established at the second network device; and
    wherein the status query is not protected by the at least part of the security association;
    wherein the status query does not cause the second network device to modify or apply the at least part of the security association;
    in response to the status query, receiving a verifiable reply message that is indicative of whether the at least part of the security association was already established at the second network device.

2. The method of claim 1 wherein detecting, at the first network device, the incompatibility in the security association between the first network device and the second network device comprises receiving an unsecured message indicating that the second network device does not have the child process of the security association; and wherein transmitting, from the first network device, the status query to the second network device comprises:
    in response to receiving the unsecured message, transmitting, from the first network device, a secured status message to the second network device in order to verify that the child process of the security association is not already established at the second network device, the secured message being transmitted in accordance with the parent process of the security association between the first network device and the second network device.

3. The method of claim 1 further comprising: receiving an unsecured message indicating that the second network device does not have the parent process of the security association; the method further comprising:
    in response to receiving the unsecured message, transmitting, from the first network device, an unsecured status query to the second network device in order to verify that the parent process of the security association is not already established at the second network device, wherein the unsecured status query includes a verification code for determining the authenticity of any message received by the first network device in response to the unsecured status query transmitted to the second network device.

4. The method of claim 1 wherein receiving the verifiable reply message that is indicative of whether the at least part of the security association is already established at the second network device comprises:
    receiving a reply message with a verification code, the reply message indicating that the second network device has the parent process of the security association; and
    processing the verification code in order to determine the authenticity of the reply message.

5. The method of claim 1 wherein receiving a verifiable reply message that is indicative of whether the at least part of the security association is already established at the second network device comprises:
    receiving a reply message with a verification code, the reply message indicating that the second network device does not have the parent process of the security association; and
    processing the verification code in order to determine the authenticity of the reply message;
    wherein the processing of the verification code determines that the authenticity of the reply message is valid, and, in response, the method further comprising initiating, from the first network device, renegotiation of a security association between the second network device and the first network device.

6. The method of claim 1 wherein transmitting, from the first network device, the status query to the second network device comprises:
    generating a verification code to be included with the status query, the verification code enabling authentication of any message received by the first network device in response to the status query, the verification code further comprising a time dependent key that is used in calculating a checksum of at least one of the verification code and the message that is received in response to the status query.

7. The method of claim 1 further comprising:
    providing a dampening mechanism in order to mitigate the effect of a denial of service attack, the dampening mechanism causing the first network device to ignore messages transmitted from other network devices in the network for a predetermined dampening time, wherein providing a dampening mechanism is in response to:
        receiving an error message involving a security association that was logged by a suspect network device, the dampening mechanism causing the first network device to ignore messages transmitted by the suspect network device for the predetermined dampening time.

8. The method of claim 1 further comprising:
providing a throttling mechanism in order to mitigate the effect of a denial of service attack, the throttling mechanism limiting the rate at which network devices can transmit status queries to other network devices in the network.

9. A first network device comprising:
one or more memory systems storing one or more instructions;
one or more processors;
one or more communications interfaces;
one or more interconnection mechanisms coupling the one or more memory systems, the one or more processors and the one or more communications interfaces; and
wherein the one or more instructions, when executed by the one or more processors, cause:
transmitting, from the first network device, a secured message to a second network device across a network, the first network device and the second network device having a security association including a parent process and a corresponding child process;
detecting, at the first network device, an incompatibility in the security association between the first network device and the second network device;
in response to detecting the incompatibility in the security association, transmitting, from the first network device, a status query to the second network device in order to verify whether at least part of the security association is already established at the second network device; and
wherein the status query is not protected by the at least part of the security association;
wherein the status query does not cause the second network device to modify or apply the at least part of the security association;
in response to the status query, receiving a verifiable reply message that is indicative of the status of whether the at least part of the security association is already established at the second network device.

10. The first network device of claim 9 further comprising instructions which when executed cause receiving an unsecured message indicating that the second network device does not have the child process of the security association; and wherein the one or more instructions that cause transmitting, from the first network device, the status query to the second network device comprises one or more instructions which when executed cause:
in response to receiving the unsecured message, transmitting, from the first network device, a secured status message to the second network device in order to verify that the child process of the security association is not already established at the second network device, the secured message being transmitted in accordance with the parent process of the security association between the first network device and the second network device.

11. The first network device of claim 9 wherein the one or more instructions that cause receiving the verifiable reply message that is indicative of whether the at least part of the security association is already established at the second network device comprises one or more instructions which when executed cause:
receiving a reply message with a verification code, the reply message indicating that the second network device does not have the parent process of the security association;
processing the verification code in order to determine the authenticity of the reply message; and
wherein the processing of the verification code determines that the authenticity of the reply message is valid, and, in response, initiating, from the first network device, renegotiation of a security association between the second network device and the first network device.

12. The first network device of claim 9 wherein the one or more instructions that cause transmitting, from the first network device, the status query to the second network device comprises one or more instructions which when executed cause:
generating a verification code to be included with the status query, the verification code enabling authentication of any message received by the first network device in response to the status query, the verification code further comprising a time dependent key that is used in calculating a checksum of at least one of the verification code and the message that is received in response to the status query.

13. The first network device of claim 9 further comprising one or more instructions which when executed cause:
receiving an unsecured message indicating that the second network device does not have the parent process of the security association;
in response to receiving the unsecured message, transmitting, from the first network device, an unsecured status query to the second network device in order to verify that the parent process of the security association is not already established at the second network device, wherein the unsecured status query includes a verification code for determining the authenticity of any message received by the first network device in response to the unsecured status query transmitted to the second network device.

14. The first network device of claim 9 further comprising one or more instructions which when executed cause:
providing a dampening mechanism in order to mitigate the effect of a denial of service attack, the dampening mechanism causing the first network device to ignore messages transmitted from other network devices in the network for a predetermined dampening time, wherein providing a dampening mechanism is in response to:
receiving an error message involving a security association that was logged by a suspect network device, the dampening mechanism causing the first network device to ignore messages transmitted by the suspect network device for the predetermined dampening time.

15. One or more non-transitory computer-readable storage media storing one or more instructions, which, when executed by one or more processors, cause the one or more processors to perform:
transmitting, from the first network device, a secured message to a second network device across a network, the first network device and the second network device having a security association including a parent process and a corresponding child process;
detecting, at the first network device, an incompatibility in the security association between the first network device and the second network device;
in response to detecting the incompatibility in the security association, transmitting, from the first network device, a status query to the second network device in order to verify whether at least part of the security association is already established at the second network device; and wherein the status query is not protected by the at least part of the security association;

wherein the status query does not cause the second network device to modify or apply the at least part of the security association;

in response to the status query, receiving a verifiable reply message that is indicative of the status of whether the at least part of the security association is already established at the second network device.

16. The one or more non-transitory computer-readable storage media of claim 15 further comprising one or more instructions which when executed cause:

receiving an unsecured message indicating that the second network device does not have the child process of the security association;

in response to receiving the unsecured message, transmitting, from the first network device, a secured status message to the second network device in order to verify that the child process of the security association is not already established at the second network device, the secured message being transmitted in accordance with the parent process of the security association between the first network device and the second network device.

17. The one or more non-transitory computer-readable storage media of claim 15 further comprising one or more instructions which when executed cause:

receiving a reply message with a verification code, the reply message indicating that the second network device does not have the parent process of the security association;

processing the verification code in order to determine the authenticity of the reply message; and wherein the processing of the verification code determines that the authenticity of the reply message is valid, and, in response, initiating, from the first network device, renegotiation of a security association between the second network device and the first network device.

18. The one or more non-transitory computer-readable storage media of claim 15 further comprising one or more instructions which when executed cause:

generating a verification code to be included with the status query, the verification code enabling authentication of any message received by the first network device in response to the status query, the verification code further comprising a time dependent key that is used in calculating a checksum of at least one of the verification code and the message that is received in response to the status query.

19. The one or more non-transitory computer-readable storage media of claim 15 further comprising one or more instructions which when executed cause:

receiving an unsecured message indicating that the second network device does not have the parent process of the security association;

in response to receiving the unsecured message, transmitting, from the first network device, an unsecured status query to the second network device in order to verify that the parent process of the security association is not already established at the second network device, wherein the unsecured status query includes a verification code for determining the authenticity of any message received by the first network device in response to the unsecured status query transmitted to the second network device.

20. The one or more non-transitory computer-readable storage media of claim 15 further comprising one or more instructions which when executed further cause:

providing a dampening mechanism in order to mitigate the effect of a denial of service attack, the dampening mechanism causing the first network device to ignore messages transmitted from other network devices in the network for a predetermined dampening time, wherein providing a dampening mechanism is in response to:

receiving an error message involving a security association that was logged by a suspect network device, the dampening mechanism causing the first network device to ignore messages transmitted by the suspect network device for the predetermined dampening time.

* * * * *